(12) United States Patent
Shintani et al.

(10) Patent No.: US 6,565,747 B1
(45) Date of Patent: May 20, 2003

(54) SPIRAL WOUND TYPE SEPARATION MEMBRANE ELEMENT

(75) Inventors: Takuji Shintani, Ibaraki (JP); Hisao Hachisuka, Ibaraki (JP); Katsumi Ishii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/546,991

(22) Filed: Apr. 11, 2000

(30) Foreign Application Priority Data

Apr. 13, 1999 (JP) .......................................... 11-105848
Sep. 7, 1999 (JP) .......................................... 11-253457

(51) Int. Cl.$^7$ .............................................. B01D 63/00
(52) U.S. Cl. ............................ 210/321.74; 210/321.83; 210/493.4; 264/285
(58) Field of Search ................... 210/321.83, 321.74, 210/493.4; 264/285

(56) References Cited

U.S. PATENT DOCUMENTS

| | | | |
|---|---|---|---|
| 4,301,013 A | * | 11/1981 | Setti et al. |
| 4,548,714 A | * | 10/1985 | Kirwan, Jr. et al. |
| 4,906,372 A | * | 3/1990 | Hopkins |
| 5,108,604 A | * | 4/1992 | Robbins |
| 5,114,582 A | * | 5/1992 | Sandstrom et al. |
| 5,128,037 A | * | 7/1992 | Pearl et al. |
| 5,562,827 A | * | 10/1996 | Schmidt et al. |
| 6,168,648 B1 | * | 1/2001 | Ootani et al. |

FOREIGN PATENT DOCUMENTS

| | | |
|---|---|---|
| DE | 43 28 408 C1 | 8/1994 |
| EP | 0 508 646 A1 | 10/1992 |
| EP | 0 963 783 A1 | 12/1999 |
| JP | 61-64303 U | 5/1986 |
| JP | 5-168869 A | 7/1993 |
| JP | 09299770 | * 11/1997 |
| WO | WO 97/23279 A1 | 7/1997 |

\* cited by examiner

*Primary Examiner*—Ana Fortuna
(74) *Attorney, Agent, or Firm*—Akin, Gump, Strauss, Hauer & Feld, L.L.P.

(57) ABSTRACT

A spiral wound type separation membrane element includes a spiral wound type membrane component formed by superposing separation membranes of membrane materials supported on nonwoven fabric members on both surfaces of a permeated liquid passage forming member and bonding three sides with an adhesive thereby defining an envelope-like membrane, mounting an opening of the envelope-like membrane on a water collection pipe and bonding the same with an adhesive and spirally winding the envelope-like membrane around the outer peripheral surface of the water collection pipe along with a raw liquid passage forming member. The outer peripheral surface of the envelope-like membrane forming the spiral wound type membrane component is covered with a sheath member, and anti-telescopic members are mounted on both end surfaces of the envelope-like membrane respectively. Each of the aforementioned components forming the spiral wound type separation membrane element is made of heat-resistant alkali-resistant plastic.

17 Claims, 7 Drawing Sheets

SPIRAL WOUND TYPE SEPARATION MEMBRANE ELEMENT

BACKGROUND OF THE INVENTION

1. Field of the Invention

The present invention relates to a spiral wound type separation membrane element employed for a spiral wound type separation membrane module.

2. Description of the Prior Art

A membrane separation technique is used for various applications such as desalination of seawater or demineralization of brackish water for coping with water shortage, preparation of ultrapure water in the electronic industry and the medicinal field, recycling of waste water and separation, purification and concentration in the fields of food, medicine and fine chemical.

For example, a reverse osmosis membrane separation apparatus, an ultrafiltration apparatus, a microfiltration apparatus or the like is employed for membrane separation. Such a membrane separation apparatus utilizes a spiral wound type separation membrane module, which is excellent in pressure resistance and can be manufactured at a relatively low cost. In general, the spiral wound type separation membrane module is formed by a pressure vessel storing a spiral wound type separation membrane element having a separation membrane such as a reverse osmosis membrane, an ultrafiltration membrane or a microfiltration membrane.

FIG. 6 is a typical partially fragmented perspective view showing an exemplary conventional spiral wound type separation membrane element 100, and FIG. 7 is a typical sectional view along the axial direction of the spiral wound type separation membrane element 100 shown in FIG. 6.

As shown in FIG. 6, the spiral wound type separation membrane element 100 is formed by superposing separation membranes 22 on both surfaces of a permeated liquid passage forming member 30 and bonding three sides thereby defining an envelope-like membrane 40 having a three-layer structure, bonding an opening of the envelope-like membrane 40 to a water collection pipe 50 formed by a perforated hollow pipe and spirally winding the envelope-like membrane 40 around the outer peripheral surface of the water collection pipe 50 along with a raw liquid passage forming member 60.

In this case, each separation membrane 22 is prepared by supporting a membrane material on a nonwoven fabric member made of polyester fiber. Thus, the separation membrane 22 has mechanical strength.

The permeated liquid passage forming member 30 and the raw liquid passage forming member 60 are formed by netty substances made of polyester fiber.

As shown in FIG. 7, first and second anti-telescopic members 21a and 21b are mounted on both end surfaces of the wound envelope-like membrane 40 in the spiral wound type separation membrane element 100. The first and second anti-telescopic members 21a and 21b prevent the wound envelope-like membrane 40 from telescopically extending due to supply pressure for a raw liquid 7. The first anti-telescopic member 21a is formed with a hole receiving an end of the water collection pipe 50 and a raw liquid inlet 15. The second anti-telescopic member 21b is formed with a hole receiving another end of the water collection pipe 50 and a concentrated liquid outlet 16. The outer peripheral surface of the envelope-like membrane 40 is covered with a sheath member 20 made of glass fiber. The envelope-like membrane 40 and the sheath member 20 are bonded to each other with an adhesive.

As shown in FIGS. 6 and 7, the raw liquid 7 is supplied from the raw liquid inlet 15 of the first anti-telescopic member 21a. The supplied raw liquid 7 flows along the raw liquid passage forming member 60 on the outer side of the envelope-like membrane 40, and is discharged from the concentrated liquid outlet 16 of the second anti-telescopic member 21b as a concentrated liquid 9. On the other hand, a liquid permeated through the separation membranes 22 in the process of feeding the raw liquid 7 along the raw liquid passage forming member 60 flows into the water collection pipe 50 along the permeated liquid passage forming member 30, and is taken out from the other end of the water collection pipe 50 as a permeated liquid 8.

The spiral wound type separation membrane element 100 is mainly employed for desalination of seawater and brackish water. In this case, the water temperature of the supplied raw liquid 7, i.e., seawater or brackish water is not more than 40° C. and the pH thereof is 2 to 10, generally around 7. In the spiral wound type separation membrane element 100, therefore, the nonwoven fabric members forming the separation membranes 2, the permeated liquid passage forming member 30 and the raw liquid passage forming member 60, all made of polyester fiber, are neither decomposed nor dissolved by the raw liquid 7, and the sheath member 20 made of glass fiber is neither decomposed nor dissolved by the raw liquid 7.

When the spiral wound type separation membrane element 100 is employed for process treatment in the field of food, medicine or fine chemical or waste liquid treatment following the process treatment, however, a high-concentration alkaline solution having a high water temperature and high pH is supplied as the raw liquid 7. Such an alkaline solution is basically an inorganic alkaline solution, and a general example thereof is aqueous NaOH.

In this case, the nonwoven fabric members forming the separation membranes 22, the permeated liquid passage forming member 30 and the raw liquid passage forming member 60, all made of polyester fiber as described above, are decomposed and dissolved by the alkaline solution having a high temperature and a high concentration beyond basic physical properties. Further, the sheath member 20 made of glass fiber is also decomposed and dissolved.

When supplying a high-concentration alkaline solution having a water temperature of at least 40° C. and a pH value of 13 with no pressure or supplying a high-concentration alkaline solution having a water temperature of at least 60° C. and a pH value of 11 in a state pressurized to at least 10 kgf/cm$^2$, for example, the nonwoven fabric members forming the separation membranes 22, the permeated liquid passage forming member 30 and the raw liquid passage forming member 60 are deformed due to decomposition and dissolution. When the permeated liquid passage forming member 30 and the raw liquid passage forming member 60 are deformed, the permeated liquid passage and the raw liquid passage are blocked. Thus, the permeate flow rate of the spiral wound type separation membrane element 100 is remarkably reduced. Further, the separation membranes 22 lose mechanical strength due to deformation of the nonwoven fabric members serving as support members. Thus, the separation membranes 22 are broken to reduce membrane separability. In addition, it is conceivable that the deformed sheath member 20 cannot withstand pressure in high-pressure running and is broken due to reduction of strength. Thus, the spiral wound type separation membrane element 100 cannot provide sufficient membrane separability.

Also when the first and second anti-telescopic members 21a and 21b, the water collection pipe 50 and an adhesive (not shown) employed for assembling the spiral wound type separation membrane element 100 are decomposed and dissolved by the alkaline solution having a high temperature and a high concentration, the membrane separability of the spiral wound type separation membrane element 100 is reduced.

SUMMARY OF THE INVENTION

An object of the present invention is to provide a spiral wound type separation membrane element capable of treating an alkaline solution having a high temperature and a high concentration.

A spiral wound type separation membrane element according to an aspect of the present invention comprises a spiral wound type membrane component including a water collection pipe, a separation membrane having a nonwoven fabric member and a membrane material supported on the nonwoven fabric member and wound around the water collection pipe, a raw liquid passage forming member arranged on a surface of the separation membrane for forming a raw liquid passage and a permeated liquid passage forming member arranged on another surface of the separation membrane for forming a permeated liquid passage, and having an outer peripheral surface and an end surface, an end surface holding member holding the end surface of the spiral wound type membrane component, and an adhesive bonding at least two of the water collection pipe, the separation membrane, the raw liquid passage forming member, the permeated liquid passage forming member and the end surface holding member to each other, and the water collection pipe, the separation membrane, the raw liquid passage forming member, the permeated liquid passage forming member, the end surface holding member and the adhesive are made of heat-resistant alkali-resistant plastic.

In the spiral wound type separation membrane element, the water collection pipe, the separation membrane, the raw liquid passage forming member, the permeated liquid passage forming member, the end surface holding member and the adhesive are made of heat-resistant alkali-resistant plastic, whereby the members forming the aforementioned spiral wound type separation membrane element are neither decomposed nor dissolved also when an alkaline solution having a high temperature and a high concentration is supplied as a raw liquid. Therefore, the alkaline solution having a high temperature and a high concentration can be treated with the spiral wound type separation membrane element with stable performance.

In particular, the permeated liquid passage forming member and the raw liquid passage forming member are neither decomposed nor dissolved, whereby the permeated liquid passage and the raw liquid passage are not blocked. Therefore, the spiral wound type separation membrane element obtains a stable permeate flow rate. Further, the nonwoven fabric member supporting the separation membrane is neither decomposed nor dissolved, whereby the strength of the separation membrane is not reduced and the separation membrane is not damaged. Therefore, the spiral wound type separation membrane element attains stable membrane separability.

The spiral wound type separation membrane element may further comprise a sheath member covering the outer peripheral surface of the spiral wound type membrane component, and the sheath member may be made of heat-resistant alkali-resistant plastic. In this case, the sheath member made of heat-resistant alkali-resistant plastic is neither decomposed nor dissolved also when an alkaline solution having a high temperature and a high concentration is supplied as the raw liquid. Therefore, the strength of the sheath member is not reduced and the alkaline solution can be treated with stable performance also when the spiral wound type separation membrane element is run under high pressure.

The sheath member may include fibers, made of the heat-resistant alkali-resistant plastic, wound around the outer peripheral surface of the spiral wound type membrane component and the heat-resistant alkali-resistant plastic for embedding the fibers.

The sheath member may include a cylindrical netty substance, mounted on the outer peripheral surface of the spiral wound type membrane component, made of the heat-resistant alkali-resistant plastic. The sheath member may further include the heat-resistant alkali-resistant plastic for embedding the cylindrical netty substance.

The sheath member may include a planar netty substance, wound around the outer peripheral surface of the spiral wound type membrane component, made of the heat-resistant alkali-resistant plastic, and a member of the heat-resistant alkali-resistant plastic fixing a prescribed portion of the planar netty substance. The sheath member may further include the heat-resistant alkali-resistant plastic for embedding the planar netty substance.

The sheath member having the aforementioned structure is neither decomposed nor dissolved also when an alkaline solution having a high temperature and a high concentration is supplied as the raw liquid.

In the spiral wound type separation membrane element, the heat-resistant alkali-resistant plastic may include polyphenylene sulfide, polypropylene, polyphenylene oxide, polysulfone or epoxy resin. Such a material has heat resistance and alkaline resistance. Therefore, the members forming the spiral wound type separation membrane element made of the aforementioned material have heat resistance and alkali resistance.

In the spiral wound type separation membrane element, the permeated liquid passage forming member may include a netty substance formed by fibers made of the heat-resistant alkali-resistant plastic.

The netty substance is preferably arranged to guide a permeated liquid into the water collection pipe. Thus, the permeated liquid can be quickly guided into the water collection pipe, and permeation through the separation membrane is facilitated.

In the netty substance, the diameter of the fibers is preferably at least 0.1 mm and not more than 1 mm, and the distance between the fibers is preferably at least 0.1 mm and not more than 1 mm.

In this case, the resistance of the permeated liquid passage formed by the permeated liquid passage forming member can be reduced, while the charge density of the separation membrane in the spiral wound type separation membrane element can be increased to obtain a sufficient membrane area. Further, the shape of the fibers can be prevented from being transferred to the separation membrane by pressure applied in running, whereby the separation membrane is not damaged. Thus, a spiral wound type separation membrane element having high performance is implemented.

In the spiral wound type separation membrane element, the raw liquid passage forming member may include a netty substance formed by fibers made of the heat-resistant alkali-resistant plastic.

The netty substance is preferably so arranged that the raw liquid axially flows in the spiral wound type separation membrane element. Thus, the raw liquid can be quickly supplied, and permeation through the separation membrane is facilitated.

In the netty substance, the diameter of the fibers is preferably at least 0.1 mm and not more than 1.5 mm, and the distance between the fibers is preferably at least 1 mm and not more than 5 mm.

In this case, the resistance of the raw liquid passage formed by the raw liquid passage forming member can be reduced, while the charge density of the separation membrane in the spiral wound type separation membrane element can be increased to obtain a sufficient membrane area. Further, the shape of the fibers can be prevented from being transferred to the separation membrane by pressure applied in running, whereby the separation membrane is not damaged. Thus, a spiral wound type separation membrane element having high performance is implemented.

In a method of running a spiral wound type separation membrane element according to another aspect of the present invention, the spiral wound type separation membrane element comprises a spiral wound type membrane component including a water collection pipe, a separation membrane having a nonwoven fabric member and a membrane material supported on the nonwoven fabric member and wound around the water collection pipe, a raw liquid passage forming member arranged on a surface of the separation membrane for forming a raw liquid passage and a permeated liquid passage forming member arranged on another surface of the separation membrane for forming a permeated liquid passage, and having an outer peripheral surface and an end surface, an end surface holding member holding the end surface of the spiral wound type membrane component, and an adhesive bonding at least two of the water collection pipe, the separation membrane, the raw liquid passage forming member, the permeated liquid passage forming member and the end surface holding member to each other while the water collection pipe, the separation membrane, the raw liquid passage forming member, the permeated liquid passage forming member, the end surface holding member and the adhesive are made of heat-resistant alkali-resistant plastic, and the method of running a spiral wound type separation membrane element comprises steps of supplying an alkaline solution from an end of the spiral wound type separation membrane element as a raw liquid and taking out a permeated liquid from at least an end of the water collection pipe.

In the method of running a spiral wound type separation membrane element, the alkaline solution is supplied into the spiral wound type separation membrane element from an end thereof as the raw liquid. The raw liquid flows in the spiral wound type separation membrane element along the raw liquid passage forming member. Permeation takes place through the separation membrane in this process. The permeated liquid permeated through the separation membrane flows into the water collection pipe along the permeated liquid passage forming member, and is taken out from at least an end of the water collection pipe.

In the aforementioned spiral wound type separation membrane element, the water collection pipe, the separation membrane, the raw liquid passage forming member, the permeated liquid passage forming member, the end surface holding member and the adhesive are made of heat-resistant alkali-resistant plastic, whereby the members forming the spiral wound type separation membrane element are neither decomposed nor dissolved also when the alkaline solution is supplied as the raw liquid. Therefore, the an alkaline solution can be treated with the spiral wound type separation membrane element with stable performance.

In particular, the permeated liquid passage forming member and the raw liquid passage forming member are neither decomposed nor dissolved, whereby the permeated liquid passage and the raw liquid passage are not blocked. Therefore, a stable permeate flow rate can be obtained. Further, the nonwoven fabric member supporting the separation membrane is neither decomposed nor dissolved, whereby the strength of the separation membrane is not reduced and the separation membrane is not damaged. Therefore, stable membrane separability can be attained.

The pH of the alkaline solution may be at least 11. Further, the water temperature of the alkaline solution may be at least 40° C. Also when supplying such an alkaline solution having a high temperature and a high concentration, treatment can be performed with stable performance.

In the aforementioned method of running a spiral wound type separation membrane element, the spiral wound type separation membrane element may further comprise a sheath member, made of heat-resistant alkali-resistant plastic, covering the outer peripheral surface of the spiral wound type membrane component, and the method of running a spiral wound type separation membrane element may further comprise a step of taking out a concentrated liquid from another end of the spiral wound type separation membrane element. In this case, the sheath member made of the heat-resistant alkali-resistant plastic is neither decomposed nor dissolved also when the alkaline solution is supplied as the raw liquid. Therefore, the strength of the sheath member is not reduced and the alkaline solution can be treated with stable performance also in high-pressure running. In particular, treatment can be made with stable performance also when an alkaline solution having a high temperature and a high concentration is supplied as the raw liquid.

In the method of running a spiral wound type separation membrane element, the raw liquid passage forming member may include a netty substance formed by fibers made of the heat-resistant alkali-resistant plastic, and the step of supplying the alkaline solution may include a step of feeding the alkaline solution in the axial direction of the spiral wound type separation membrane element along the netty substance.

Thus, the raw liquid is quickly supplied in the spiral wound type separation membrane element, and permeation through the separation membrane is facilitated.

The permeated liquid passage forming member may include a netty substance formed by fibers made of the heat-resistant alkali-resistant plastic, and the step of taking out the permeated liquid may include a step of guiding the permeated liquid into the water collection pipe along the netty substance.

Thus, the permeated liquid is quickly guided into the water collection pipe in the spiral wound type separation membrane element, and permeation through the separation membrane is facilitated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
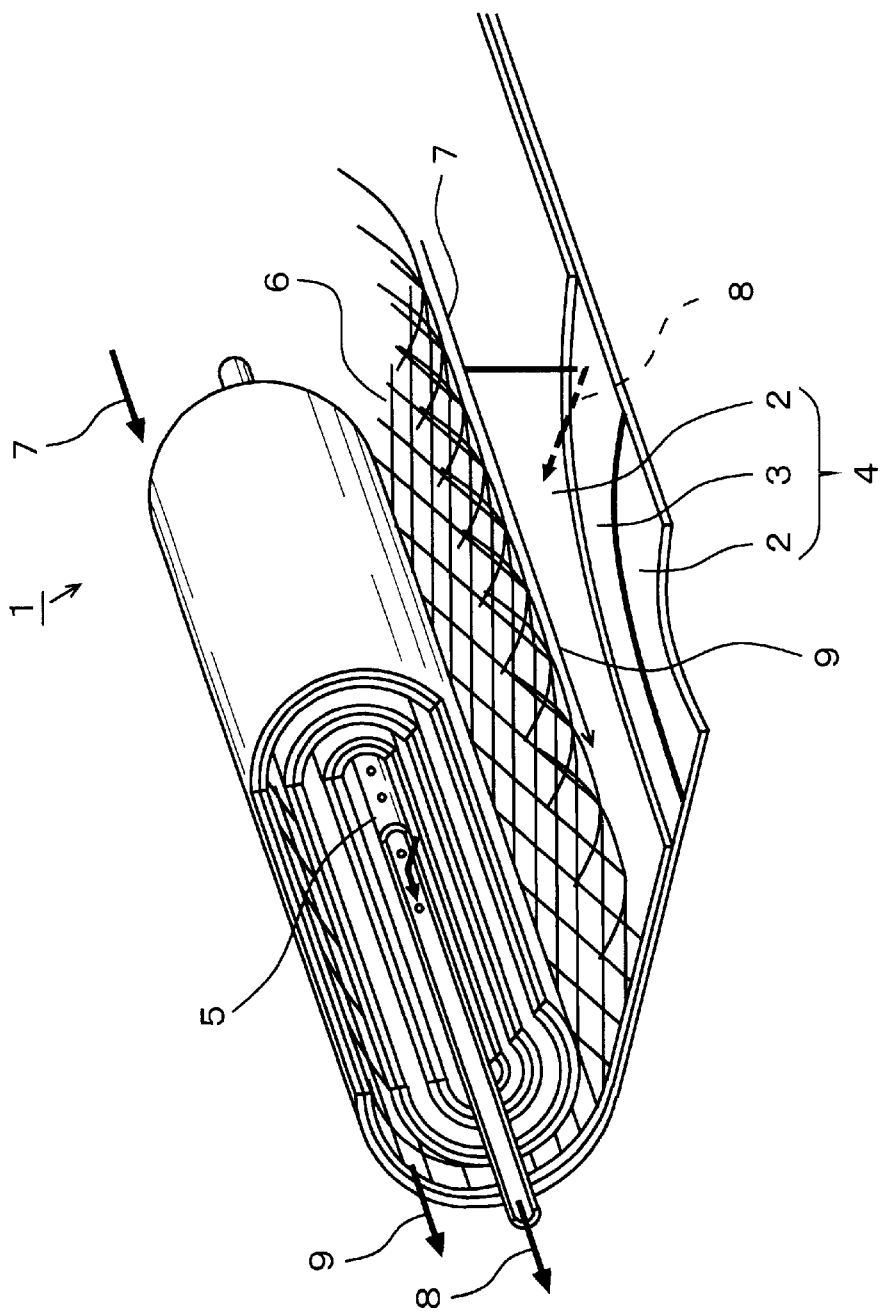
FIG. 1 is a typical partially fragmented perspective view showing an exemplary spiral wound type separation membrane element according to the present invention.
Figure 2:
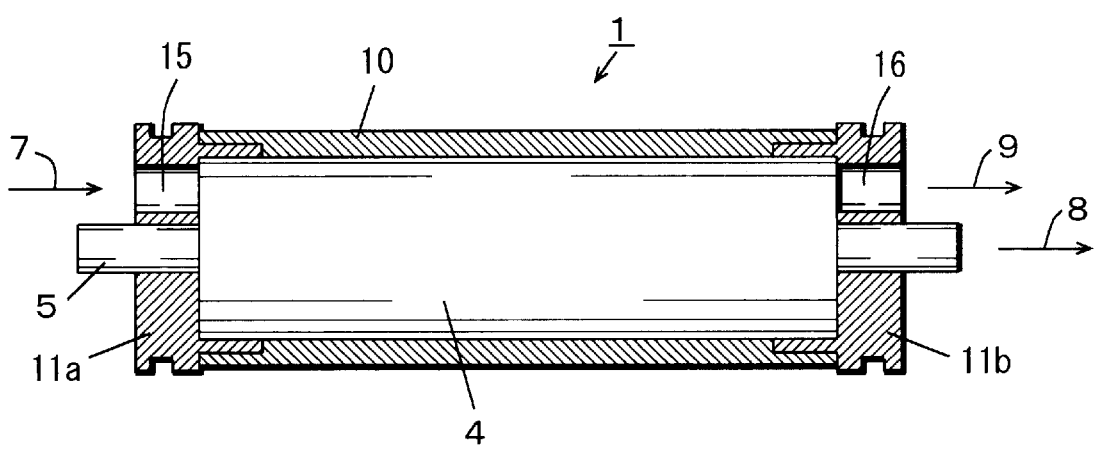
FIG. 2 is a typical sectional view along the axial direction of the spiral wound type separation membrane element shown in FIG. 1.

FIG. 1 is a typical partially fragmented perspective view showing an exemplary spiral wound type separation membrane element 1 according to the present invention, and FIG. 2 is a typical sectional view along the axial direction of the spiral wound type separation membrane element 1 shown in FIG. 1.

As shown in FIG. 1, the spiral wound type separation membrane element 1 includes a spiral wound type membrane component formed by superposing separation membranes 2 on both surfaces of a permeated liquid passage forming member 3 and bonding three sides with an adhesive thereby defining an envelope-like membrane 4, mounting an opening of the envelope-like membrane 4 on a water collection pipe 5 and bonding the envelope-like membrane 4 to the water collection pipe 5 with an adhesive and spirally winding the envelope-like membrane 4 around the outer peripheral surface of the water collection pipe 5 along with a raw liquid passage forming member 6.

In this case, each separation membrane 2 is prepared by supporting a membrane material made of heat-resistant alkali-resistant plastic on a nonwoven fabric member made of heat-resistant alkali-resistant plastic.

The permeated liquid passage forming member 3 is formed by a netty substance prepared by tricot-weaving fibers of heat-resistant alkali-resistant plastic into a net and heat-setting this net.

In the permeated liquid passage forming member 3, the diameter of the fibers forming the netty substance is preferably 0.1 to 1 mm. If the diameter of the fibers is less than 0.1 mm, the thickness of the permeated liquid passage forming member 3 is so reduced that a permeated liquid passage is narrowed and the resistance thereof is increased although the charge density of the separation membranes 2 in the spiral wound type separation membrane element 1 is increased. Thus, a permeated liquid insufficiently flows and the permeate flow rate of the spiral wound type separation membrane element 1 is reduced. If the diameter of the fibers exceeds 1 mm, on the other hand, the membrane area is reduced since the charge density of the separation membranes 2 in the spiral wound type separation membrane element 1 is reduced, although the permeated liquid passage is widened and hence the permeated liquid sufficiently flows. Thus, the spiral wound type separation membrane element 1 is insufficient in practicality.

The distance between the fibers forming the netty substance is preferably 0.1 to 1 mm. If the distance between the fibers is less than 0.1 mm, the resistance in the permeated liquid passage is so increased that the permeated liquid insufficiently flows. If the distance between the fibers exceeds 1 mm, on the other hand, the shape of the fibers is transferred to the separation membranes 2 due to pressure applied to the spiral wound type separation membrane element 1 in running, to damage the separation membranes 2. Thus, the performance of the separation membranes 2 is reduced. Further, the separation membranes 2 fill up clearances between the fibers to block the permeated liquid passage. When the distance between the fibers is less than 0.1 mm or in excess of 1 mm, therefore, the spiral wound type separation membrane element 1 is insufficient in practicality.

The raw liquid passage forming member 6 is formed by a netty substance prepared by tricot-weaving fibers of heat-resistant alkali-resistant plastic into a net and heat-setting this net.

In the raw liquid passage forming member 6, the diameter of the fibers forming the netty substance is preferably 0.1 to 1.5 mm. If the diameter of the fibers is less than 0.1 mm, the thickness of the raw liquid passage forming member 6 is so reduced that a raw liquid passage is narrowed and the resistance thereof is increased although the charge density of the separation membranes 2 in the spiral wound type separation membrane element 1 is increased. Thus, a raw liquid insufficiently flows and the membrane separability is reduced. If the diameter of the fibers exceeds 1.5 mm, on the other hand, the membrane area is reduced since the charge density of the separation membranes 2 in the spiral wound type separation membrane element 1 is reduced, although the thickness of the raw liquid passage forming member 6 is increased and hence the resistance in the raw liquid passage is reduced. Thus, the spiral wound type separation membrane element 1 is insufficient in practicality.

The distance between the fibers forming the netty substance is preferably 1 to 5 mm. If the distance between the fibers is less than 1 mm, the resistance in the raw liquid passage is so increased that the raw liquid insufficiently flows. If the distance between the fibers exceeds 5 mm, on the other hand, the shape of the fibers is transferred to the separation membranes 2 due to the pressure applied to the spiral wound type separation membrane element 1 in running, to damage the separation membranes 2. Thus, the performance of the separation membranes 2 is reduced. Further, the separation membranes 2 fill up clearances between the fibers to block the permeated liquid passage. When the distance between the fibers is less than 1 mm or in excess of 5 mm, therefore, the spiral wound type separation membrane element 1 is insufficient in practicality.

As shown in FIG. 2, the outer peripheral surface of the envelope-like membrane 4 forming the spiral wound type membrane component is covered with a sheath member 10.

Figure 3:
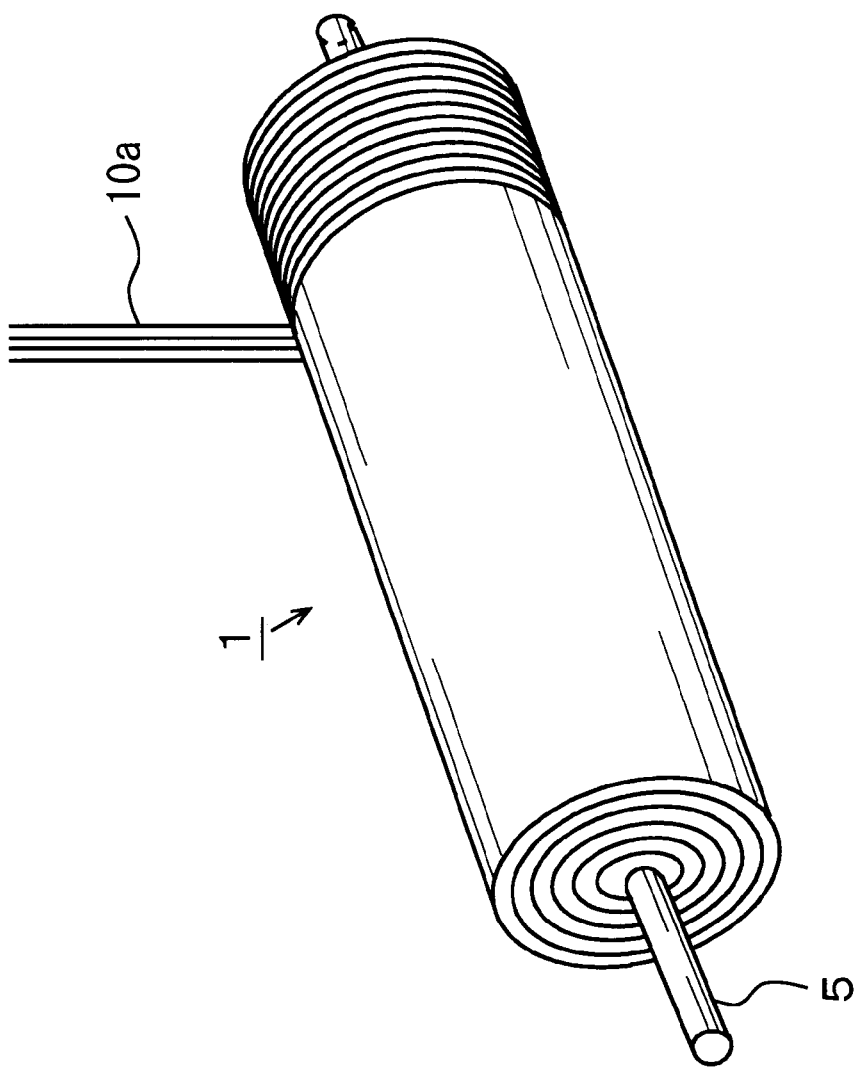
FIG. 3 is a model diagram showing an exemplary method of forming a sheath member shown in FIG. 2.

This sheath member 10 is formed by the following method:

FIG. 3 is a model diagram showing an exemplary method of forming the sheath member 10 shown in FIG. 2. In this case, fibers 10a of heat-resistant alkali-resistant plastic are wound (roved) around the outer peripheral surface of the envelope-like membrane 4 and embedded in epoxy resin for forming the sheath member 10. For example, fibers 10a of heat-resistant alkali-resistant impregnated with epoxy resin may be wound around the outer peripheral surface of the envelope-like membrane 4.

Figure 4:
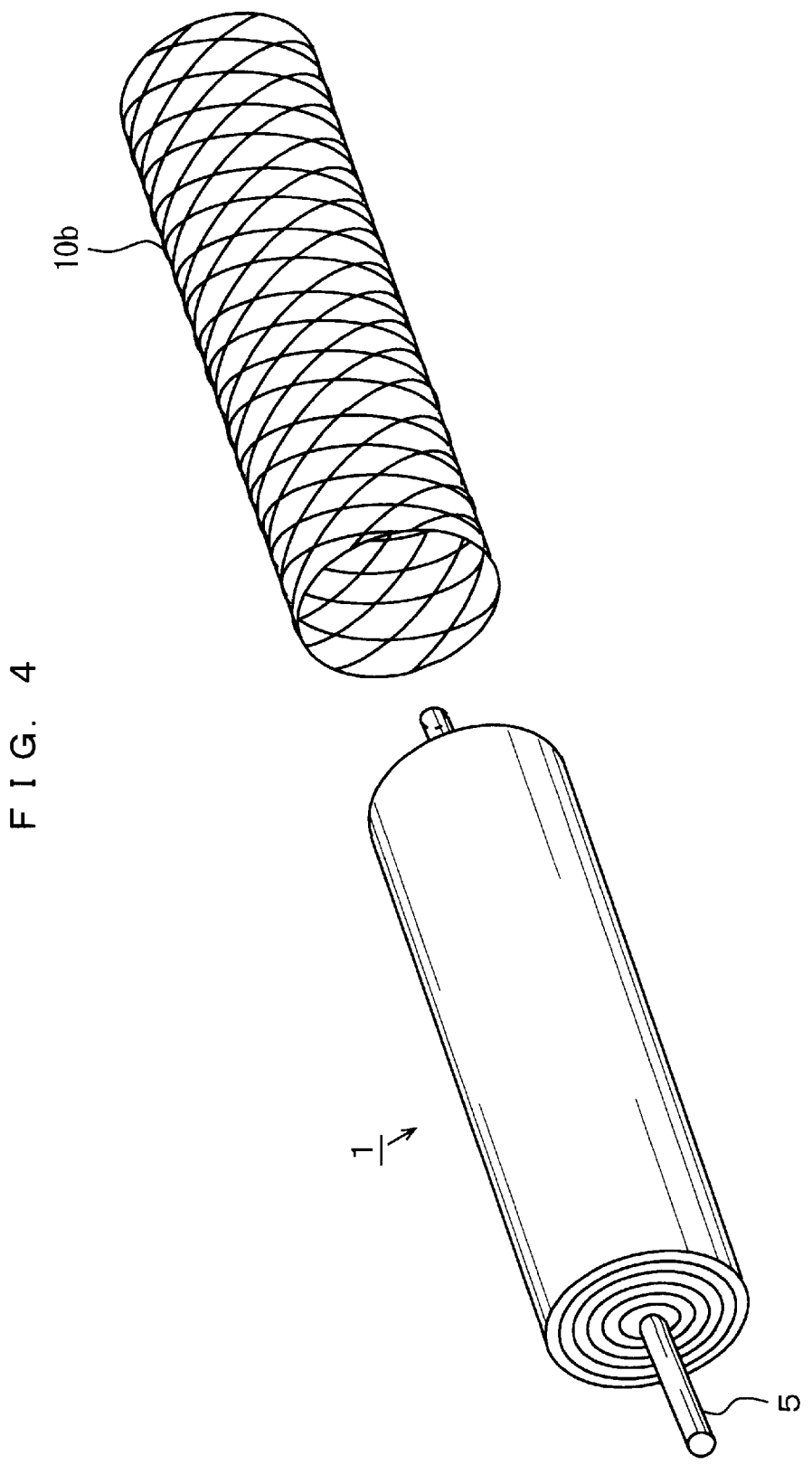
FIG. 4 is a model diagram showing another exemplary method of forming the sheath member shown in FIG. 2.

FIG. 4 is a model diagram showing another exemplary method of forming the sheath member 10 shown in FIG. 2.

In this case, a cylindrical netty substance 10b formed by fibers of heat-resistant alkali-resistant plastic is mounted on the outer peripheral surface of the envelope-like membrane 4 for forming the sheath member 10. The cylindrical netty substance 10b may be embedded in epoxy resin after the same is mounted on the outer peripheral surface of the envelope-like membrane 4.

Figure 5:
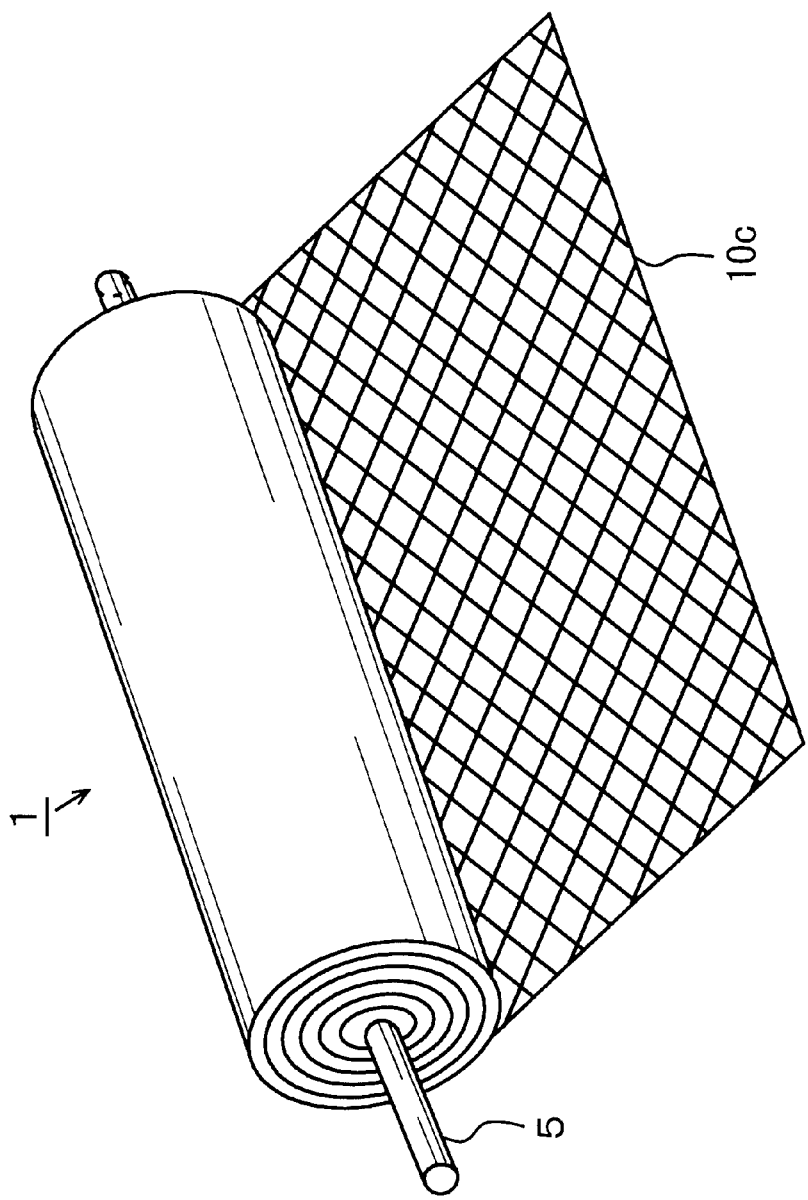
FIG. 5 is a model diagram showing still another exemplary method of forming the sheath member shown in FIG. 2.

FIG. 5 is a model diagram showing still another exemplary method of forming the sheath member 10 shown in FIG. 2. In this case, a planar netty substance 10c made of fibers of heat-resistant alkali-resistant plastic is wound around the outer peripheral surface of the envelope-like membrane 4 and a prescribed position of the wound netty substance 10c is fixed with epoxy resin for forming the sheath member 10. The planar netty substance 10c may be embedded in epoxy resin after the same is wound around the outer peripheral surface of the envelope-like membrane 4.

The sheath member 10 formed by any of the aforementioned methods shown in FIGS. 3 to 5, formed by the fibers having heat resistance and alkali resistance and epoxy resin, is neither decomposed nor dissolved also when the same is exposed to an alkaline solution having a high temperature and a high concentration.

While embedding is performed with epoxy resin in the above description, embedding may alternatively be performed with heat-resistant alkali-resistant plastic other than the epoxy resin.

As shown in FIG. 2, a first anti-telescopic member 11a and a second anti-telescopic member 11b are mounted on a raw liquid side end surface and a concentrated liquid side end surface of the envelope-like membrane 4 wound around the water pipe 5 respectively as end holding members.

The first and second anti-telescopic members 11a and 11b are formed by integrally molding discoidal parts covering the end surfaces of the envelope-like membrane 4 and the sheath member 10 and cylindrical parts covering the outer peripheries of the ends of the envelope-like membrane 4. Holes receiving ends of the water collection pipe 5 are provided at the centers of the discoidal parts of the first and second anti-telescopic members 11a and 11b. In this case, the end of the water collection pipe 5 closer to the first anti-telescopic member 11a is sealed. A raw liquid inlet 15 is formed in the discoidal part of the first anti-telescopic member 11a, and a concentrated liquid outlet 16 is formed in the discoidal part of the second anti-telescopic member 11b. Grooves for mounting sealing members are provided on the outer peripheral surfaces of the discoidal parts of the first and second anti-telescopic members 11a and 11b.

In the spiral wound type separation membrane element 1, the water collection pipe 5, the first and second anti-telescopic members 11a and 11b and the adhesive employed for assembling the spiral wound type separation membrane element 1 is made of heat-resistant alkali-resistant plastic.

The heat-resistant alkali-resistant plastic forming the membrane materials and the nonwoven fabric members of the separation membranes 2, the permeated liquid passage forming member 3, the raw liquid passage forming member 6, the sheath member 10, the water collection pipe 5, the first and second anti-telescopic members 11a and 11b and the adhesive is not particularly restricted so far as the plastic is resistant against a temperature of at least 100° C. under atmospheric pressure and in water and has alkali resistance. For example, polypropylene (PP), polyphenylene sulfide (PPS), polyphenylene oxide (PPO), polysulfone (PSF), epoxy resin or the like can be employed.

Membrane separation of an alkaline solution having a high temperature and a high concentration with the spiral wound type separation membrane element 1 is now described. The spiral wound type separation membrane element 1 is stored in a pressure vessel (not shown) in running. The pressure vessel and the spiral wound type separation membrane element 1 are fluid-tightly sealed with a sealing member.

As shown in FIGS. 1 and 2, the alkaline solution having a high temperature and a high concentration is supplied into the spiral wound type separation membrane element 1 from the raw liquid inlet 15 of the first anti-telescopic member 11a as a raw liquid 7. The supplied raw liquid 7 axially flows along the raw liquid passage forming member 6, and is discharged from the concentrated liquid outlet 16 of the second anti-telescopic member 11b as a concentrated liquid 9. On the other hand, a permeated liquid 8 permeated through the separation membranes 2 in the process of the raw liquid 7 flowing along the raw liquid passage forming member 6 flows into the water collection pipe 5 along the permeated liquid passage forming member 3, and is taken out from the end of the water collection pipe 5 closer to the second anti-telescopic member 11b.

In the spiral wound type separation membrane element 1 according to this embodiment, the membrane materials and the nonwoven fabric members of the separation membranes 2, the permeated liquid passage forming member 3, the raw liquid passage forming member 6, the sheath member 10, the water collection pipe 5, the first and second anti-telescopic members 11a and 11b and the adhesive are made of the heat-resistant alkali-resistant plastic. Also in membrane separation of the alkaline solution having a high temperature and a high concentration, therefore, the aforementioned members are not deformed by decomposition and dissolution. In particular, the nonwoven fabric members of the separation membranes 2, the permeated liquid passage forming member 3, the raw liquid passage forming member 6 and the sheath member 10 can be prevented from decomposition and dissolution, whereby the following effects are attained:

It is possible to prevent deformation of the permeated liquid passage forming member 3 and the raw liquid passage forming member 6, so to prevent the permeate liquid passage and the raw liquid passage from blocking, thereby reduction of the permeate flow rate can be suppressed. Further, reduction of the mechanical strength of the separation membranes 2 can be suppressed for preventing damage by preventing the nonwoven fabric members of the separation membranes 2 from deformation, thereby reduction of the membrane separability can be suppressed. Further, reduction of the strength of the sheath member 10 can be suppressed by preventing the sheath member 10 from deformation. Thus, the spiral wound type separation membrane element 1 can be run with stable performance, particularly with a stable permeate flow rate.

EXAMPLES

Membrane separation was carried out with spiral wound type separation membrane elements according to Inventive Examples 1 and 2 and comparative examples 1 and 2 described below. In each of Inventive Examples 1 and 2 and comparative examples 1 and 2, a spiral wound type separation membrane element having a membrane area of 6.5 $m^2$, including a polyether sulfone composite reverse osmosis membrane (NTR-7450 by Nitto Denko Corporation) prepared by supporting a membrane material on a nonwoven fabric member as each separation membrane 2, was employed.

Inventive Example 1

In Inventive Example 1, membrane separation was carried out with the spiral wound type separation membrane element 1 shown in FIGS. 1 and 2.

In this case, the nonwoven fabric member forming each separation membrane 2 was made of polypropylene.

The permeated liquid passage forming member 3 was formed by a netty substance prepared by plain-weaving polyphenylene sulfide fibers. The diameter of the fibers forming the netty substance was 0.2 mm, and the distance between the fibers was 0.3 mm.

The raw liquid passage forming member 6 was formed by a netty substance prepared by plain-weaving polypropylene fibers. The diameter of the fibers forming the netty substance was 0.3 mm, and the distance between the fibers was 3 mm.

Further, the sheath member 10 was formed by winding (roving) polypropylene fibers 10a and epoxy resin around the outer peripheral surface of the envelope-like membrane 4, as shown in FIG. 3.

The spiral wound type separation membrane element 1 having the aforementioned structure was stored in a pressure vessel (not shown), and subjected to a first reverse osmosis test under conditions shown in Table 1.

TABLE 1

| RAW LIQUID | AQUEOUS NaCl (CONCENTRATION: 2000 ppm, pH = 6.5, WATER TEMPERATURE: 23° C.) |
|---|---|
| SUPPLY PRESSURE | 10 kgf/cm$^2$ |

In the first reverse osmosis test, the permeate flow rate of the spiral wound type separation membrane element 1 was 10.0 m$^3$/day and the concentration of the permeated liquid was 950 ppm.

After the first reverse osmosis test, the spiral wound type separation membrane element 1 was run under conditions shown in Table 2.

TABLE 2

| RAW LIQUID | 10% AQUEOUS NaOH (pH = 14, WATER TEMPERATURE: 60° C.) |
|---|---|
| SUPPLY PRESSURE | NONE |
| RUNNING TIME | 8 h. |

Thereafter a second reverse osmosis test was made under the conditions shown in Table 1 again. In the second reverse osmosis test, the permeate flow rate of the spiral wound type separation membrane element 1 was 9.8 m$^3$/day and the concentration of the permeated liquid was 960 ppm.

Inventive Example 2

In Inventive Example 2, a spiral wound type separation membrane element 1 similar in structure to that of Inventive Example 1 was employed. In Inventive Example 2, the spiral wound type separation membrane element 1 was run and subjected to reverse osmosis tests similarly to Inventive Example 1, except that the spiral wound type separation membrane element 1 was run under conditions shown in Table 3 after the first reverse osmosis test.

TABLE 3

| RAW LIQUID | 20% AQUEOUS NaOH (pH = 14, WATER TEMPERATURE: 60° C.) |
|---|---|
| SUPPLY PRESSURE | 10 kgf/cm$^2$ |
| RUNNING TIME | 24 h. |

In the spiral wound type separation membrane element 1 according to Inventive Example 2, the permeate flow rate in the first reverse osmosis test was 10.0 m$^3$/day and the concentration of the permeated liquid was 930 ppm. Further, the permeate flow rate in the second reverse osmosis test was 9.7 m$^3$/day and the concentration of the permeated liquid was 920 ppm.

Comparative Example 1

Figure 6:
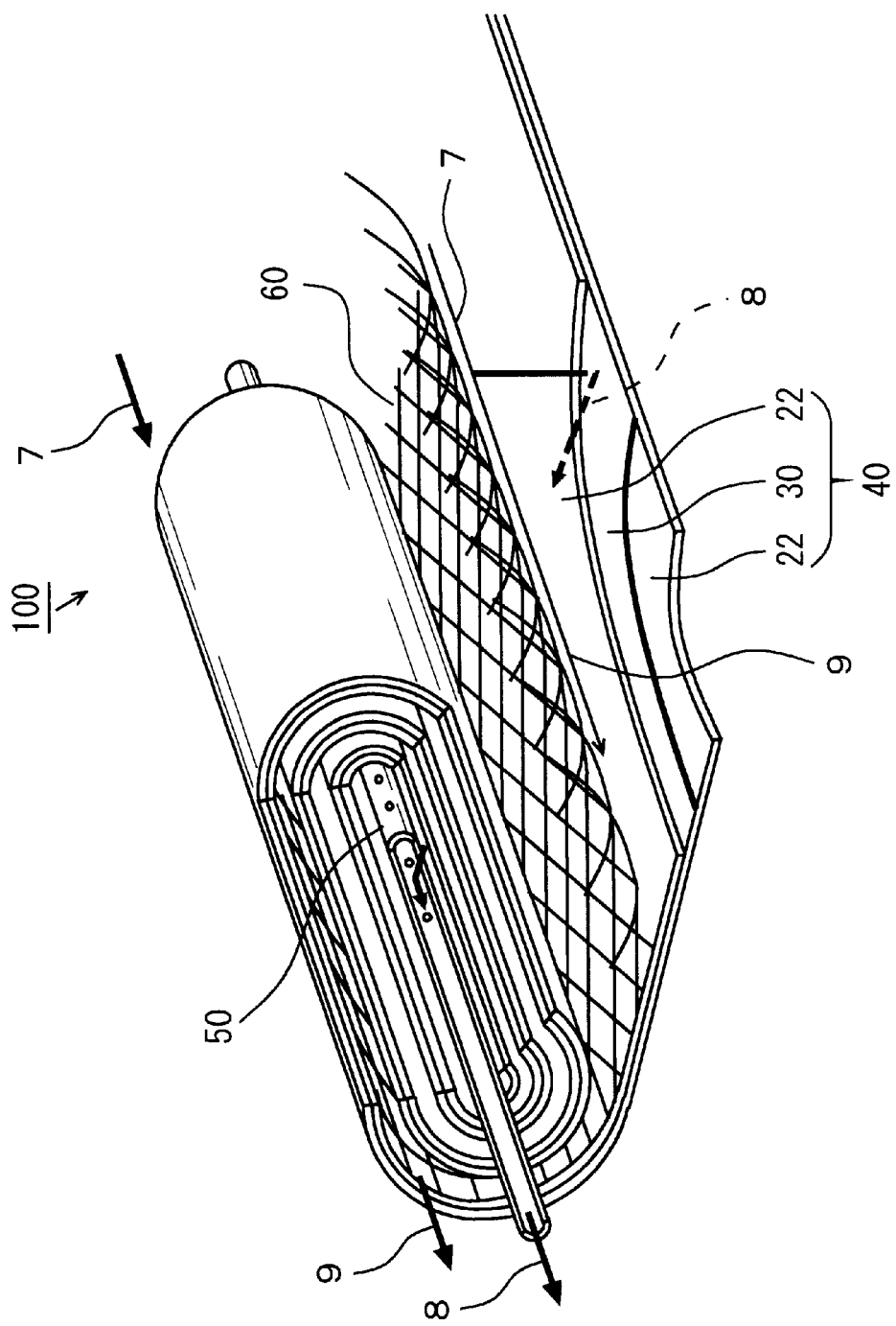
FIG. 6 is a typical partially fragmented perspective view showing an exemplary conventional spiral wound type separation membrane element.
Figure 7:
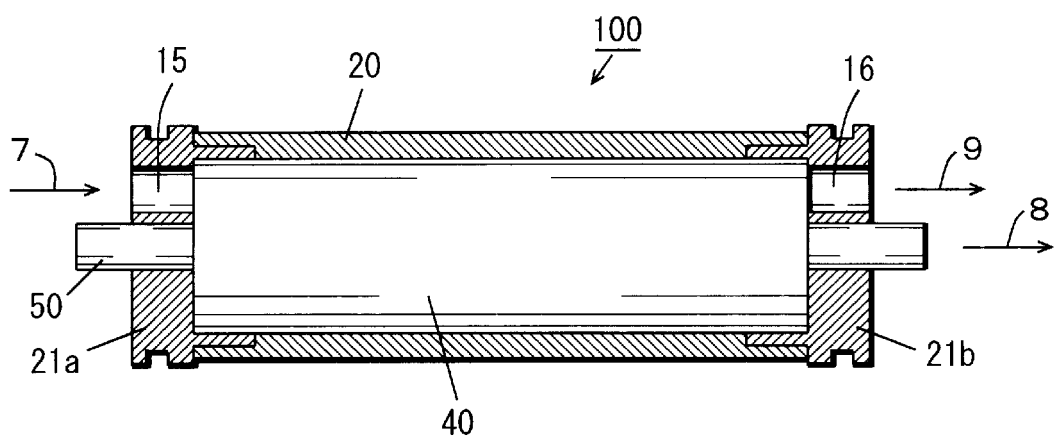
FIG. 7 is a typical sectional view along the axial direction of the spiral wound type separation membrane element shown in FIG. 6.

For comparison with Inventive Example 1, membrane separation was carried out with the spiral wound type separation membrane element 100 shown in FIGS. 6 and 7 in comparative example 1. The spiral wound type separation membrane element 100 according to comparative example 1 was similar in structure to the spiral wound type separation membrane element 1 according to Inventive Example 1 except that the nonwoven fabric members forming the separation membranes 2, the permeated liquid passage forming member 30 and the raw liquid passage forming member 60 were made of polyester fiber and the sheath member 20 was formed by winding glass fiber around the outer peripheral surface of the envelope-like membrane 40.

The aforementioned spiral wound type separation membrane element 100 was run and subjected to reverse osmosis tests similarly to Inventive Example 1.

In the spiral wound type separation membrane element 100 according to comparative example 1, the permeate flow rate in the first reverse osmosis test was 10.0 m$^3$/day and the concentration of the permeated liquid was 940 ppm. Further, the permeate flow rate in the second reverse osmosis test was 5.5 m$^3$/day and the concentration of the permeated liquid was 1350 ppm.

Comparative Example 2

For comparison with Inventive Example 2, a spiral wound type separation membrane element 100 according to comparative example 2, similar in structure to that of comparative example 1 shown in FIGS. 6 and 7, was run and subjected to reverse osmosis testes similarly to Inventive Example 2.

In the spiral wound type separation membrane element 100 according to comparative example 2, the permeate flow rate in the first reverse osmosis test was 10.0 m$^3$/day and the concentration of the permeated liquid was 950 ppm. Further, the permeate flow rate in the second reverse osmosis test was 15.0 m$^3$/day and the concentration of the permeated liquid was 1500 ppm.

As shown in Inventive Example 1 and comparative example 1, the nonwoven fabric members of the separation membranes 2, the permeated liquid passage forming member 3, the raw liquid passage forming member 6 and the sheath member 10 are made of heat-resistant alkali-resistant plastic in the spiral wound type separation membrane element 1 according to Inventive Example 1 and hence the nonwoven fabric members, the permeated liquid passage forming member 3, the raw liquid passage forming member 6 and the sheath member 10 are neither decomposed nor dissolved by 10% aqueous NaOH. Therefore, reduction of the permeate flow rate was hardly observed also in the second reverse osmosis test.

In the spiral wound type separation membrane element 100 according to comparative example 1, on the other hand, the permeated liquid passage forming member 30 is partially decomposed by 10% aqueous NaOH and hence the separation membranes 22 fill up clearances between the fibers forming the permeated liquid passage forming member 30 to block the permeated liquid passage. Thus, remarkable reduction was observed in the permeate flow rate in the second reverse osmosis test.

As shown in Inventive Example 2 and comparative example 2, the nonwoven fabric members, the permeated liquid passage forming member 3, the raw liquid passage forming member 6 and the sheath member 10 are neither decomposed nor dissolved also in the spiral wound type separation membrane element 1 according to Inventive Example 2 supplied with high-concentration aqueous NaOH of 20% for a long time under high pressure. Therefore, reduction of the permeate flow rate was hardly observed also in the second reverse osmosis test.

In the spiral wound type separation membrane element 100 according to comparative example 2, on the other hand, the permeated liquid passage forming member 30 is partially decomposed by the high-concentration aqueous NaOH and hence the separation membranes 22 fill up clearances between the fibers forming the permeated liquid passage forming member 30 to block the permeated liquid passage. Further, the nonwoven fabric members are also decomposed after a lapse of a longer time, and hence the separation membranes 22 cannot be supported but damaged. Thus, it was impossible to attain sufficient membrane separability and remarkable reduction was observed in the permeate flow rate. Further, the sheath member 20 was deformed due to decomposition and dissolution and hence reduced in strength.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A spiral wound separation membrane element comprising:
    a spiral wound membrane component including a water collection pipe, a separation membrane having a nonwoven fabric member and a membrane material supported on said nonwoven fabric member and wound around said water collection pipe, a raw liquid passage forming member arranged on a surface of said separation membrane for forming a raw liquid passage and a permeated liquid passage forming member arranged on another surface of said separation membrane for forming a permeated liquid passage, and having an outer peripheral surface and an end surface;
    an end surface holding member holding said end surface of said spiral wound membrane component; and
    an adhesive bonding at least two of said water collection pipe, said separation membrane, said raw liquid passage forming member, said permeated liquid passage forming member and said end surface holding member to each other;
    wherein all of said water collection pipe, said separation membrane, said raw liquid passage forming member, said permeated liquid passage forming member, said end surface holding member and said adhesive are made of heat-resistant alkali-resistant plastic, and wherein said end surface holding member comprises polyphenylene sulfide.

2. The spiral wound separation membrane element according to claim 1, further comprising a sheath member covering said outer peripheral surface of said spiral wound membrane component, wherein
    said sheath member is made of heat-resistant alkali-resistant plastic.

3. The spiral wound separation membrane element according to claim 2, wherein
    said sheath member includes fibers, made of said heat-resistant alkali-resistant plastic, wound around said outer peripheral surface of said spiral wound membrane component, and said heat-resistant alkali-resistant plastic for embedding said fibers.

4. The spiral wound separation membrane element according to claim 2, wherein
    said sheath member includes a cylindrical netty substance, mounted on said outer peripheral surface of said spiral wound membrane component, made of said heat-resistant alkali-resistant plastic.

5. The spiral wound separation membrane element according to claim 4, wherein
    said sheath member further includes said heat-resistant alkali-resistant plastic for embedding said cylindrical netty substance.

6. The spiral wound separation membrane element according to claim 2, wherein
    said sheath member includes a planar netty substance, wound around said outer peripheral surface of said spiral wound membrane component, made of said heat-resistant alkali-resistant plastic, and a member of said heat-resistant alkali-resistant plastic fixing a prescribed portion of said planar netty substance.

7. The spiral wound separation membrane element according to claim 6, wherein
    said sheath member further includes said heat-resistant alkali-resistant plastic for embedding said planar netty substance.

8. The spiral wound separation membrane element according to claim 1, wherein
    said heat-resistant alkali-resistant plastic comprises a plastic selected from the group consisting of polyphenylene sulfide, polypropylene, polyphenylene oxide, polysulfone and epoxy resin, and wherein
        said water collection pipe, said separation membrane, said raw liquid passage forming member and said permeated liquid passage forming member each comprises a plastic selected from the group consisting of polyphenylene sulfide, polypropylene, polyphenylene oxide, polysulfone and epoxy resin.

9. The spiral wound separation membrane element according to claim 1, wherein
    said permeated liquid passage forming member includes a netty substance formed by fibers made of said heat-resistant alkali-resistant plastic.

10. The spiral wound separation membrane element according to claim 9, wherein
    said netty substance is arranged to guide a permeated liquid into said water collection pipe.

11. The spiral wound separation membrane element according to claim 9, wherein
    the diameter of said fibers forming said netty substance is at least 0.1 mm and not more than 1 mm.

12. The spiral wound separation membrane element according to claim 9, wherein the distance between said fibers in said netty substance is at least 0.1 mm and not more than 1 mm.

13. The spiral wound separation membrane element according to claim 1, wherein said raw liquid passage forming member includes a netty substance formed by fibers made of said heat-resistant alkali-resistant plastic.

14. The spiral wound separation membrane element according to claim 13, wherein said netty substance is so arranged that a raw liquid axially flows in said spiral wound separation membrane element.

15. The spiral wound separation membrane element according to claim 13, wherein the diameter of said fibers forming said netty substance is at least 0.1 mm and not more than 1.5 mm.

16. The spiral wound separation membrane element according to claim 13, wherein the distance between said fibers in said netty substance is at least 1 mm and not more than 5 mm.

17. The spiral wound separation membrane element according to claim 1, wherein said adhesive comprises epoxy resin.

* * * * *